United States Patent [19]

Shimura et al.

[11] Patent Number: 4,910,761
[45] Date of Patent: Mar. 20, 1990

[54] RADIO TELEPHONE

[75] Inventors: Yukihiro Shimura; Noboru Saegusa; Yuichiro Takagawa, all of Tokyo; Shoichi Tozuka, Kanagawa; Yasushi Hatakeyama, Saitama, all of Japan

[73] Assignees: NEC Corporation; Nippon Telegraph & Telephone Co., both of Tokyo, Japan

[21] Appl. No.: 318,160

[22] Filed: Mar. 2, 1989

[30] Foreign Application Priority Data

Mar. 4, 1988 [JP] Japan .................................. 63-52063

[51] Int. Cl.⁴ .............................................. H04Q 7/04
[52] U.S. Cl. ........................................ 379/61; 379/58; 455/127
[58] Field of Search ...................... 379/58, 61, 62, 63; 455/127, 343

[56] References Cited

U.S. PATENT DOCUMENTS

| | | | |
|---|---|---|---|
| 4,513,446 | 4/1985 | Leslie | 455/73 |
| 4,544,924 | 10/1985 | French | 340/825.69 |
| 4,591,914 | 5/1986 | Hakamada et al. | 358/190 |
| 4,595,795 | 6/1986 | Endo | 455/127 |
| 4,723,304 | 2/1988 | Maeda | 455/69 |
| 4,726,052 | 2/1988 | Kato et al. | 379/61 |
| 4,731,814 | 3/1988 | Becker et al. | 379/62 |
| 4,761,806 | 8/1988 | Toki | 379/61 |

Primary Examiner—Robert Lev
Attorney, Agent, or Firm—Ostrolenk, Faber, Gerb & Soffen

[57] ABSTRACT

A radio telephone having a base unit connected to a wired telephone line, a handset unit connectable to the base unit over a radio channel and provided with a hook switch, and a charger for selectively charging the handset unit. The handset unit is automatically controlled to either an on-hook state or an off-hook state when removed from the charger, depending upon the hook state in which the handset unit has been held before the start of charging.

4 Claims, 1 Drawing Sheet

RADIO TELEPHONE

BACKGROUND OF THE INVENTION

The present invention relates to a radio telephone and, more particularly, to a radio telephone having a base unit which is capable of communicating with another terminal equipment via a wired telephone network.

Telephones of the type described include a cordless telephone which has a base unit and a handset unit. The base unit is connected to a wired telephone network line, while the handset unit is connectable to the base unit over a radio channel. Usually, when the handset unit is in a standby condition wherein no communication is held, it is connected to a charger in order to charge a battery accommodated therein. To hold a conversion, the handset unit is removed from the charger and then an off-hooking operation is performed.

A drawback with the prior art cordless telephone described above is that a person has to operate a hook switch every time he or she desired to communicate with another person on the telephone. More specifically, the telephone involves two consecutive steps of manipulation, i.e., removing the handset unit from the charger and pressing the hook switch and therefore cannot establish a communication rapidly.

SUMMARY OF THE INVENTION

It is therefore an object of the present invention to provide a radio telephone which can be handled rapidly in the even of communication.

It is another object of the present invention to provide a generally improved radio telephone.

In accordance with the present invention, in a radio telephone having a base unit connected to a wired telephone line, a handset unit connectable to the base unit over a radio channel and having a hook switch, and a charger for selectively charging the handset unit, the handset unit comprises a charge detecting circuit for determining whether or not the handset unit is being charged by the charger, a memory for storing a state of the hook switch which has occurred before the start of charging by the charger, and a controller for constantly monitoring an output of the hook switch and, upon turn of the output of the hook switch from a charging state to a charge interruption state, controlling the handset unit to a state of the hook switch which is stored in the memory.

BRIEF DESCRIPTION OF THE DRAWING

The above and other objects, features and advantages of the present invention will become more apparent from the following detailed description taken with the accompanying drawing in which.

DESCRIPTION OF THE PREFERRED EMBODIMENT

Figure 1:
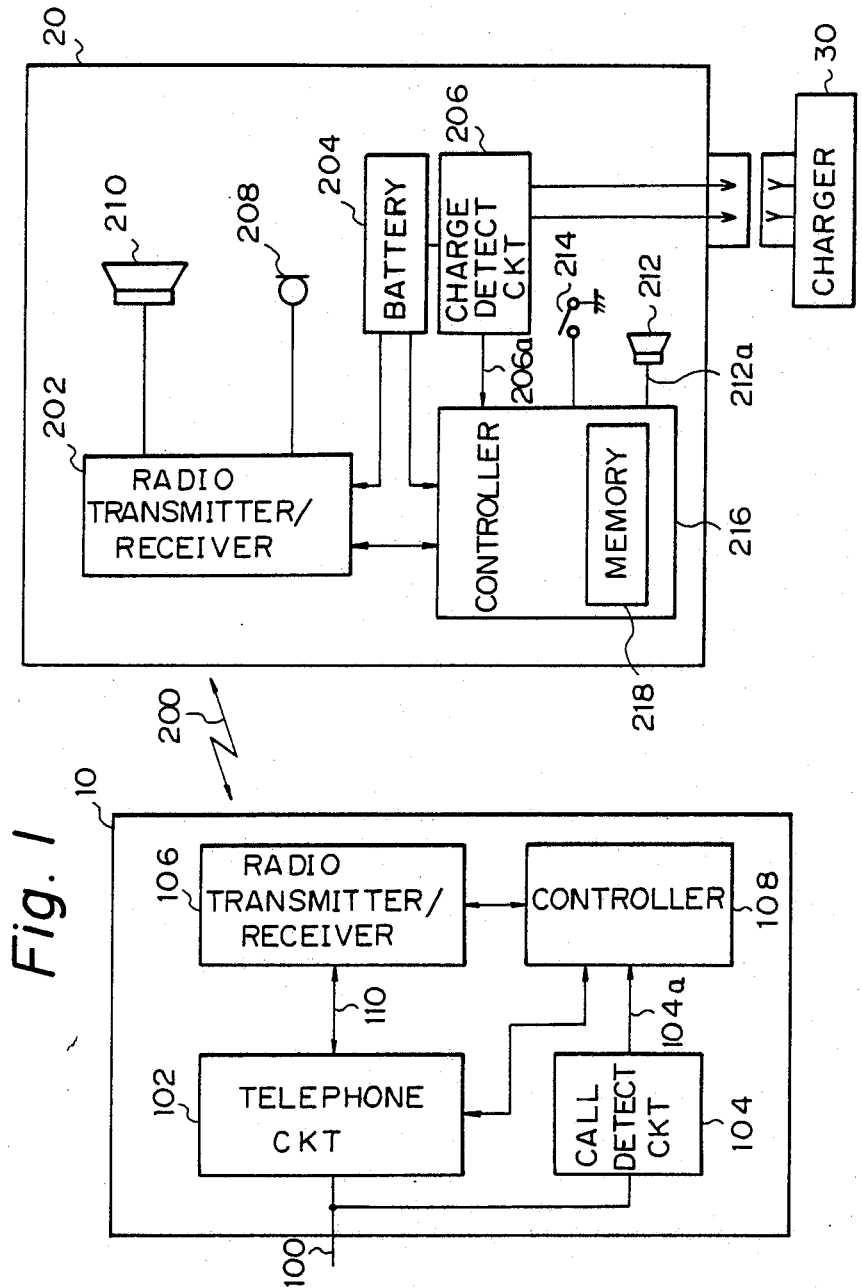
FIG. 1 is a block diagram schematically showing a radio telephone embodying the present invention.

Referring to FIG. 1, a preferred embodiment of the radio telephone in accordance with the present invention is shown. As shown, the radio telephone includes a base unit 10 which is connected to a wired telephone line 100 which extends from a wired telephone network (not shown). A handset unit 20 is connectable to the base unit 10 over a radio channel which is schematically represented by a double-headed arrow 200 in the figure. A charger 30 is provided for selectively charging the handset unit 20. The base unit 10 is made up of a telephone circuit 102 accommodating the wired telephone line 100, a call detecting circuit 104 for detecting an incoming call received over the telephone line 100, a radio transmitter/receiver 106 for selectively transmitting and receiving voice and data signals from the handset unit 20 over the radio channel 200, and a controller 108 for recognizing a detect signal from the call detecting circuit 104 by controlling a communication circuit and radio channels of the transmitter/receiver 106.

In the handset unit 20, a radio transmitter/receiver 202 selectively transmits and receives voice and data signals from the base unit 10 over the radio channel 200. A battery 204 plays the role of a power source of the handset unit 20 and is selectively charged by the charger 30. A charge detecting circuit 206 turns a charge signal to an ON state while the battery 204 is charged and to an OFF state while the latter is not charged. A mouthpiece in the form of a microphone 208 and an earpiece in the form of a loudspeaker 210 are connected to the transmitter/receiver 202. A sounder 212 is adapted to generate calling sound, i.e., to ring. A controller 316 controls a communication circuit and radio channels of the transmitter/receiver 202. A memory 218 is built in the controller 216 for storing a hook state, i.e., on-hook or off-hook state in which the handset unit 20 has been held before charging of the battery 204. A hook switch 214 is connected to the controller 218. Other functions assigned to the controller 216 are to deliver a ringing tone to the sounder 212 and to, upon the turn of the charge signal from ON to OFF, restore the handset unit 20 to the state which has been stored in the memory 218. Further, as the controller 216 detects a change of the charge signal from ON to OFF while the sounder 212 is ringing, i.e., while an incoming call is being detected, it immediately, controls the handset unit 20 to an off-hook state with no regard to the state being stored in the memory 218.

In operation, the handset unit 20 in a standby condition is connected to the charger 30 to be charged thereby. Detecting such a charging condition, the charge detecting circuit 206 turns a charge signal 206a coupled to the controller 216 to an ON state. As soon as the handset unit 20 is removed from the charger 30 under the standby condition, the charge from the charger 30 to the handset unit 30 is interrupted. At this time, the charge detecting circuit 206 turns the charge signal 206a to an OFF state to inform the controller 216 of the interruption of charging. Concerning the memory 218, if the handset unit 20 has been in an off-hook state before the start of charging which is caused by the charge signal 206a, the memory 218 stores a particular state corresponding to off-hook while, if the handset unit 20 has been in an on-hook state, it stores another particular state corresponding to on-hook. These states representative of off-hook and on-hook can be set as desired by using the hook switch 214.

The controller 216 of the handset unit 20 constantly monitors the output 206a of the charge detecting circuit 206. Upon the change of the charge signal 206a from ON to OFF, the controller 216 references the memory 218 and, if the state stored in the memory 218 is an off-hook state, immediately connects the handset unit 20 to the base unit 10 via the radio transmitter/receiver 202. If the memory 218 stores an on-hook state, the controller 216 so controls the transmitter/receiver 202 as to hold the handset unit 20 in an on-hook state. More specifically, if the handset unit 20 has been in an off-hook state before the start of charging, the handset unit 20 will be turned to an off-hook state as soon as it is removed from the charger 30. On the other hand, if the handset 20 has been in an on-hook state before the start of charging, it will be maintained in the on-hook state even when removed from the charge 30.

The radio telephone will be operated in response to an incoming call as follows.

When a call signal arrives at the base unit 10 over the telephone line 100, the call detecting signal 104 detects it and delivers a detect signal 104a to the controller 108. In response, the controller 108 activates the transmitter/receiver 106 to cause it into connection with the transmitter/receiver 202 of the handset unit 20 over the radio channel 301 while sending a bell sound signal to the transmitter/receiver 202. When the controller 216 of the handset unit 20 detects the bell sound signal or incoming call via the transmitter/receiver 202, it energizes the sounder 212 via a sounder drive line 212a resulting in the sounder 212 generating sound. As a person alerted to the incoming call by the sound picks up the handset unit 20 away from the charger 30, the charging operation is interrupted so that the charge detecting circuit 206 turns the charge signal 206a from ON to OFF. As a result, the controller 216 connects the handset unit 20 to the base unit 10 over the radio channel 200 and thereby establishes an off-hook state, without referencing the state stored in the memory 218. In this condition, a conversation may be held via the telephone line 100, telephone circuit 102, transmit/receive signal line 110, transmitter/receiver 106, transmitter/receiver 202, loudspeaker 210, and microphone 208.

While the illustrative embodiment has been described on the assumption that the charge 30 is independent of the base unit 10, it will be operated in exactly the same manner even if the base station 10 itself is provided with the function of the charger 30.

In summary, in accordance with the present invention, a radio telephone has a handset unit which is automatically controlled into either an on-hook state or an off-hook state when removed from a charger, depending upon the hook state in which the handset unit has been held before the start of charging by a charger. This allows the user of the telephone to choose any of two different configurations by preference, i.e., whether to set up an off-hook state automatically upon the removal of the handset unit from the charger or to set it up by manipulating a button. In response to an incoming call, the handset unit is automatically caused into an off-hook state when removed from the charger and with no regard to the hook state occurred before charging, promoting a rapid response to the incoming call.

Various modifications will become possible for those skilled in the art after receiving the teachings of the present disclosure without departing from the scope thereof.

What is claimed is:

1. In a radio telephone having a base unit connected to a wired telephone line, a handset unit connectable to said base unit over a radio channel and having a hook switch, and a charger for selectively charging said handset unit, said handset unit comprising:

charge detecting means for determining whether or not said handset unit is being charged by said charger;

memory means for storing a state of said hook switch which has occurred before a start of charging by said charge; and control means for constantly monitoring an output of said hook switch and, upon turn of the output of said hook switch from a charging state to a charge interruption state, controlling said handset unit to a state to said hook switch which is stored in said memory means.

2. A radio telephone as claimed in claim 1, wherein said control means is constructed to, when arrival of a call at said handset unit is detected and the output of said charge detecting means changes from a charging state to a charge interruption state, controls said handset unit to an off-hook state with no regard to the state of said hook switch.

3. A radio telephone as claimed in claim 1, wherein said charger is installed in said base unit.

4. A radio telephone as claimed in claim 1, wherein said charger is associated with said handset unit.

* * * * *